UNITED STATES PATENT OFFICE.

GEORGE F. AHLERS, OF COVINGTON, KENTUCKY.

CATTLE FOOD AND PROCESS OF MAKING SAME.

No. 854,791.  Specification of Letters Patent.  Patented May 28, 1907.

Application filed January 7, 1907. Serial No. 351,115.

*To all whom it may concern:*

Be it known that I, GEORGE F. AHLERS, a citizen of the United States, residing in Covington, in the county of Kenton and State of Kentucky, have invented certain new and useful Improvements in Cattle Feeds and Processes of Making the Same; and I hereby declare the following to be a full, clear, and exact description of the same, such as will enable others skilled in the art to which it appertains to make and use the same.

This invention relates to cattle feeds and processes of making the same; and consists in a cattle feed comprising a mixture of cooked and partially digested crude natural feeds with components of distillery slop and also in a method of preparing such feed comprising the steps of cooking and chemically altering crude natural feeds by the action of hot distillery slop and thereafter preparing a feeding material from such cooked and altered feeds and the distillery slop; all as more fully hereinafter set forth and as claimed.

In a prior patent No. 821,326, May 22, 1906, I have described and claimed a process of making cattle feed from distillery slop and the product of the same, such process consisting in separating distillery slop into liquid and solid portions, rendering the latter granular and absorbent, reducing the liquid to a syrup and incorporating the same interiorly into the absorbent granules and finally drying the whole. The finished product substantially represents the whole of the original grain used by the distiller, save only the starch which has been converted into alcohol and removed, and is therefore a concentrated feed, very rich in proteid matter and, proteid matter having a relatively high market value, is valuable enough to be able to stand transportation for long distances to points of consumption. In use for feeding cattle however it is customarily employed in connection with more or less carbohydrate matter equivalent to the starch which the distiller has removed, or to a portion of such starch, and forms a useful component of balanced rations or a supplement to ordinary, less nitrogenous feeds. Starch however also being relatively expensive, it is the purpose of the present invention to replace it, at least in part, with cheaper carbohydrates and to produce a feed comprising in addition to the rich proteid afforded by the slop, a portion of carbohydrate matter, doing this by a simple, cheap and ready method giving a commercially valuable product, and, incidentally, gaining many advantages in the practice of the process.

In coarse natural fibrous feeds of many kinds, and particularly in those commonly called "roughage" by the farmer, there are many carbohydrates which are intrinsically valuable but which are, as occurring in such feeds, actually relatively little available, causing such rough feeds to be usually regarded as, in a way, mere diluents; bulk-giving feeds to be used with grain, bran and like rich feeds. As to the nature of these carbohydrates, relatively little is known, but many are pentosans, such as araban and xylan, and some are hexosans. In the form in which they occur in these feeds, these bodies do not seem readily digestible. I have discovered that by cooking these roughage feeds in fresh hot distillery slop in the condition in which it leaves the still, they undergo a sort of partial digestion or partial hydrolysis, much increasing their availability as cattle feeds, and the contained carbohydrates are much more digestible by cattle, the acidity and chemical action of the slop no doubt having much influence in this regard. Ground corn cobs, straw, hay, comminuted corn stalks and many kinds of roughage show this phenomenon, and when so cooked yield large amounts of carbohydrates serving to replace the abstracted starch of the grain in the complete feed. Slop issues from the still at a high temperature and is generally quite acid, though the degree of acidity of course varies; and by introducing the roughage into such slop at once, the desired cooking and partial digestion take place before the slop cools much below the boiling point. The true celluloses forming part of the roughage are probably not much altered or changed by this cooking operation but the less definite, hydrated celluloses are more susceptible and, together with other carbohydrates, yield digestible products. If necessary, the mixture of slop and roughage may be stored for a time under circumstances reducing loss of heat, for mutual interaction. Heat may also be supplied to the mixture from an external source, but this is not ordinarily necessary. It is found that by so cooking a proportion of roughage in the slop, separating the liquid and solid portions of the mixture after such cooking, rendering the latter absorbent, reducing the liquid to a syrupy consistence, interiorly incorporating the syrup in the absorbent solids and finally drying the whole, a very advantageous method of operation is afforded and a product is made which contains in addition to the rich proteids of the slop available carbohydrates from such roughage.

Of course where very rich nitrogenous feeds are desired, as in such as are to be shipped long distances, or are intended to be used on the farm to heighten the richness of grain and other feeds less rich than desiccated slop, it is substantially undesirable to add foreign matter to the distillery slop, and it is better to rely upon the insoluble solids of the slop itself for absorption of the soluble solids, as in the manner described in the aforesaid patent. In many slops the former are in any case sufficient for convenient and advantageous working, and in all they may be made sufficient by a series of successive impregnations with the syrupy solution of the soluble solids, as described in said patent. But in many slops, and in particular in those from rye mashes, the insoluble solids are not large in amount and are somewhat disadvantageous in physical characteristics, rye slop being rather "glutinous" and containing much of its suspended matter in the form of very fine particles, tending to run through screens, and coarse and rapid filtering devices.

With such slops where, as in the present invention, a feed is desired not quite so rich in proteids and containing more carbohydrates, the use of the stated roughage bodies offers many advantages in the process of desiccating. On adding a modicum of comminuted roughage, corn cob meal being very suitable, to the hot slop as it issues from the still, the roughage is cooked and partially digested, as stated, rendering its contained carbohydrates more available. The roughage is softened, cooked and in part, no doubt, is dissolved, the dissolved constituents going to join the soluble constituents of the slop. Simultaneously, the slop itself is more or less clarified, fine floating matter being entangled or held by the fibers, so that separation into liquid and solid portions is much facilitated.

In separating the cooked mixture into liquid and solid portions, the relatively harsh fibrous matter of the cob meal or other roughage, serves as a backing or holder for the softer, frequently rather slimy, solids of the slop, permitting good and rapid separation by screens, filter presses, centrifugals or other apparatus. In a filter press, the presence of the roughage proves very desirable as forming, in a way, a sort of filtering layer or lining in the filter press, through which the liquid portions run, giving a pellucid filtrate very desirable in the subsequent evaporation in multiple effects and the like. Through such a layer derived from cooked roughage and slop, plain slop may be run to gain clear filtrates. Most slops contain considerable very finely divided matter which embarrasses the operation of evaporating apparatus and sometimes does not allow reduction to be carried as far as is desirable. But in slops cooked with roughage or in slops filtered through deposits from such roughage-slop mixtures, this fine matter is not found in the separated liquid, even where relatively rapid, coarse filtering apparatus is employed. Rye slops yield good filtrates in this manner of operation.

In the subsequent incorporation of the syrup formed from the filtered liquid into the absorbent solids, the presence of the fibrous roughage among the latter is very desirable as it adds to the volume of absorbent and is itself very absorbent. With admixed comminuted cooked roughage and slop solids, the syrup is very thoroughly absorbed, relatively little being left exteriorly of the granules, and the impregnated mass may be rapidly dried in any convenient drier without fear of sticking or burning. Usually the absorption and impregnation may be performed in one stage, though if little roughage be used or the syrup reduction be not carried far, it is sometimes desirable to perform it in several stages, drying between to restore absorptive power.

The resultant product of the complete process is a dry, granular feed comprising the insoluble solids of the slop employed admixed with the insoluble portion of the roughage remaining after the cooking operation. Interiorly incorporated in the granules are the soluble solids of the slop and the matter dissolved by the solvent action of the slop upon the roughage in the initial cooking. Ordinarily, it is a light yellow to dark brown granular mass, the color depending somewhat upon the particular method of drying adopted. With a mixture of one-third cob meal and two-thirds rye-slop solids, carried through the described process and finally dried in a hot air drier, it has something the color and appearance of ground, roasted coffee. On mastication, the granules taste initially rather sweetish, from dextrinization and caramelization in drying, and finally develop the original taste of the slop, being sourish where sour mash slop has been employed, the contained solubles coming out in such mastication. Cattle eat the new feed greedily. As the process enables the reduction of the hot slop to the dry feed to be carried out continuously and rapidly, there is no pause during which fermentation and formation of disagreeably smelling and tasting higher fatty acids, such as butyric, can occur. The contained acid of the interiorly incorporated slop solubles is mostly lactic acid which has a pleasantly sour taste without disagreeable after taste and which has no odor. The odor of the new feed is like that of caramelized grain.

To recapitulate, my process in its present preferred form consists in admixing comminuted roughage, preferably corn cob meal, with the hot slop leaving the stills, and cooking and partially digesting it thereby. I then preferably separate the liquid from the solid portions by any suitable means, render the insoluble solids absorbent by heat or pressure, reduce the liquid to a syrup, absorb this syrup in the granulated absorbent solids and dry. Impregnation and drying may be performed in several stages if desired. Drying may be done in any of the ordinary commercial apparatus sold for that purpose. Rotary driers are perfectly suitable since the sticky slop solubles being interiorly incorporated in the granules, the granular mass does not stick to the walls or clump together.

My new feed in its preferred form consists of a dry granular mass comprising particles of cooked, partially predigested comminuted roughage admixed with the insolubles of distillery slop, with the solubles of said slop and the digested solubles of the roughage interiorly incorporated therein; said feed being ordinarily light yellow to dark brown, having a pleasant odor of roasted grain, and tasting at first sweet and caramel-like and subsequently tasting more like the original slop, while devoid of any unpleasant, rancid or spoiled flavor or taste. It may of course be admixed with bran and other cattle foods in any desired proportion in making complete rations.

The cooked, partially digested roughage and slop may be fed to cattle direct without drying, but such use is not ordinarily so advantageous, particularly where the liquid is simply screened out and rejected, as this liquid contains much of the values.

What I claim is:—

1. In the manufacture of cattle feeds, the process which consists in cooking and partially digesting comminuted roughage in hot distillery slop, separating the liquid and solid components of the cooked mass, rendering the solid portion granular and absorbent, evaporating the liquid portion to a syrup, absorbing the same by the granular absorbent solids and drying the impregnated granules.

2. In the manufacture of cattle feeds, the process which consists in cooking and partially digesting comminuted roughage in hot distillery slop, separating the liquid and solid components of the cooked mass, rendering the solid portion granular and absorbent, evaporating the liquid portion to a syrup, absorbing the same by the granular absorbent solids in a plurality of stages, and drying between stages and finally drying the impregnated granules.

3. In the manufacture of cattle feeds, the process which consists in cooking and partially digesting comminuted roughage in hot distillery slop in the acid condition in which it leaves the still.

4. In the manufacture of cattle feeds, the process which comprises cooking and partially digesting corn cob meal in hot distillery slop in the acid condition in which it leaves the still.

5. In the manufacture of cattle feeds, the process which comprises cooking and partially digesting corn cob meal in hot distillery slop from the manufacture of rye whisky, said slop being in the acid condition in which it leaves the still.

6. In the manufacture of cattle feeds, the process which consists in cooking and partially digesting corn cob meal in hot distillery slop, separating the liquid and solid components of the cooked mass, rendering the solid portion granular and absorbent, reducing the liquid portion to a syrup, absorbing the same by the granular absorbent solids, and finally drying the impregnated granules.

7. In the manufacture of cattle feeds, the process which consists in cooking and partially digesting corn cob meal in hot distillery slop, separating the liquid and solid components of the cooked mass, rendering the solid portion granular and absorbent, evaporating the liquid portion to a syrup, absorbing the same by the granular absorbent solids in a plurality of stages, and drying between stages and finally drying the absorbent granules.

8. As a new cattle feed, a dry granular mass comprising granules of cooked and partially digested comminuted roughage and of the insoluble solids of distillery slop, said granules containing interiorly incorporated the soluble solids of distillery slop, said granules having a pleasant caramel-like odor and a sweetish taste on initial mastication and a different after-taste, said after-taste resembling that of the slop.

9. As a new cattle feed, a mixture of cooked and partially digested corn cob meal with components of distillery slop, said components retaining the acid nature with which they left the still.

10. As a new cattle feed, a mixture of cooked and partially digested corn cob meal with components of distillery slop from the manufacture of rye whisky, said components retaining the acid nature with which they left the still.

In testimony whereof I affix my signature in the presence of two witnesses.

GEORGE F. AHLERS.

Witnesses:
HARRY H. FULLER,
GEO. F. AHLERS, Jr.